(12) United States Patent
Yamaura et al.

(10) Patent No.: US 6,426,164 B1
(45) Date of Patent: Jul. 30, 2002

(54) NON-AQUEOUS ELECTROLYTE BATTERY INCORPORATING MAGNESIUM AS A CHARGER CARRIER

(75) Inventors: Kiyoshi Yamaura; Hisashi Kajiura, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 25 days.

(21) Appl. No.: 09/584,196

(22) Filed: May 31, 2000

(30) Foreign Application Priority Data

Jun. 4, 1999 (JP) .......................................... 11-158356

(51) Int. Cl.$^7$ ................................................ H01M 4/58
(52) U.S. Cl. ...................... 429/231.6; 49/223; 49/231.3; 49/231.1; 49/324
(58) Field of Search .............................. 429/231.6, 223, 429/231.3, 231.1, 324, 338, 337

(56) References Cited

U.S. PATENT DOCUMENTS 6,159,638 A * 12/2000 Takatera et al. ............. 429/309
6,265,109 B1 * 7/2001 Yamamoto et al. ....... 429/231.6

FOREIGN PATENT DOCUMENTS

EP 0602782 A1 6/1994
JP 05242891 9/1993

OTHER PUBLICATIONS

P. Novak et al., "Electrochemical Insertion of Magnesium in Metal Oxides and Sulfides from Aprotic Electrolytes", Journal of the Electrochemical Society, Manchester, NH, U.S.A. vol. 140, No. 1, Jan. 1993, pp. 140–144.
T. Gregory et al., "Nonaqueous Electrochemistry of magnesium—Applications to Energy Storage", Journal of the Electrochemical Society, Manchester, NH, U.S.A., vol. 137, No. 3, Mar. 1990, pp. 775–780.

* cited by examiner

Primary Examiner—Patrick Ryan
Assistant Examiner—Angela J. Martin
(74) Attorney, Agent, or Firm—Sonnenschein, Nath & Rosenthal

(57) ABSTRACT

A non-aqueous electrolyte battery capable of quickly diffusing magnesium ions and improving cycle operation resistance, incorporating a positive electrode containing $Li_xMO_2$ (where M is an element containing at least Ni or Co) as a positive-electrode active material thereof; a negative electrode disposed opposite to the positive electrode and containing a negative-electrode active material which permits doping/dedoping magnesium ions: and a non-aqueous electrolyte disposed between the positive electrode and the negative electrode and containing non-aqueous solvent and an electrolyte constituted by magnesium salt, wherein the value of x of $Li_xMO_2$ satisfies a range $0.1 \leq x \leq 0.5$.

5 Claims, 5 Drawing Sheets

NON-AQUEOUS ELECTROLYTE BATTERY INCORPORATING MAGNESIUM AS A CHARGER CARRIER

BACKGROUND OF THE INVENTION

1. Field of the Invention

The present invention relates to a non-aqueous electrolyte battery incorporating magnesium serving as a charge carrier thereof.

2. Description of the Related Art

In recent years, great progress of lithium ion secondary batteries and nickel-hydrogen secondary batteries has been made. Thus, the foregoing batteries have widely been used in portable electronic apparatuses as secondary batteries having large capacities. Another secondary battery of a type incorporating magnesium ions or calcium ions as charge carriers thereof except for lithium ions has been reported.

As a secondary battery incorporating, for example, calcium ions serving as charge carriers, a non-aqueous electrolyte battery has been disclosed in Japanese Patent Laid-Open No. 6-163080. According to the disclosure, a carbon material, such as graphite or cokes, is employed as the negative-electrode active material. Moreover, a metal oxide containing calcium, such as $CaCo_2O_4$, $Ca_3Co_4O_9$, $Ca_2Co_2O_5$, $Ca_3Co_3O_6$, $CaFeO_3$ or $CaFeO_2$, is employed as the positive-electrode active material. The foregoing non-aqueous electrolyte battery is expected to realize a capacity larger than that realized by lithium. To enlarge the capacity of calcium ion positive electrode per unit weight, a battery has been disclosed in Japanese Patent Laid-Open No. 8-321305 which incorporates a silicide or germanide of metal as the positive-electrode active material.

As a secondary battery incorporating magnesium ions as charge carriers, its possibility has been pointed by P. Novak in 1993 (J. Electrochem. Soc. Vol. 40, No.1, January (1993) 140). The disclosed battery incorporates $TiS_2$, $ZrS_2$, $RuO_2$, $Co_3O_4$ or $V_2O_5$ as the positive-electrode active material thereof. Specifically, a system incorporating $V_2O_5$ as the positive-electrode active material and electrolytic solution prepared by dissolving $Mg(ClO_4)_2$ in acetonitrile has realized a capacity of 170 mAh/g. Then, a positive-electrode active material prepared by doping magnesium ions into $MoO_3$ has been reported (M. E. Spahr;J. Power Source 54 (1995) 346).

The battery of a type incorporating the foregoing positive-electrode active material has diffusion paths for magnesium ions in positive electrode crystal in the form of a one-dimensional shape. Therefore, in general, magnesium ions cannot quickly be diffused. An influence of the foregoing slow diffusion deteriorates the load resistance and cycle operation resistance. Therefore, raising of the diffusion speed of magnesium ions and improvement in the cycle operation resistance have been required.

SUMMARY OF THE INVENTION

In view of the foregoing, an object of the present invention is to provide a non-aqueous electrolyte battery capable of raising the diffusion rate of magnesium ions and improving cycle operation resistance.

To achieve the foregoing object, according to one aspect of the present invention, there is provided a non-aqueous electrolyte battery comprising: a positive electrode containing $Li_xMO_2$ (where M is an element containing at least Ni or Co) as a positive-electrode active material thereof; a negative electrode disposed opposite to the positive electrode and containing a negative-electrode active material which permits doping/dedoping magnesium ions: and a non-aqueous electrolyte disposed between the positive electrode and the negative electrode and containing non-aqueous solvent and an electrolyte constituted by magnesium salt, wherein the value of x of $Li_xMO_2$ satisfies a range $0.1 \leq x \leq 0.5$.

The non-aqueous electrolyte battery according to the present invention has the structure that the value of x of $Li_xMO_2$ employed as the positive-electrode active material satisfies $0.1 \leq x \leq 0.5$. Therefore, lattice spaces for accommodating magnesium ions can be obtained. Moreover, the diffusion paths for magnesium ions are formed into two-dimensional shape. Therefore, magnesium ions can quickly be diffused.

Other objects, features and advantages of the invention will be evident from the following detailed description of the preferred embodiments described in conjunction with the attached drawings.

DETAILED DESCRIPTION OF THE PREFERRED EMBODIMENTS

Embodiments of the present invention will now be described.

Figure 1:
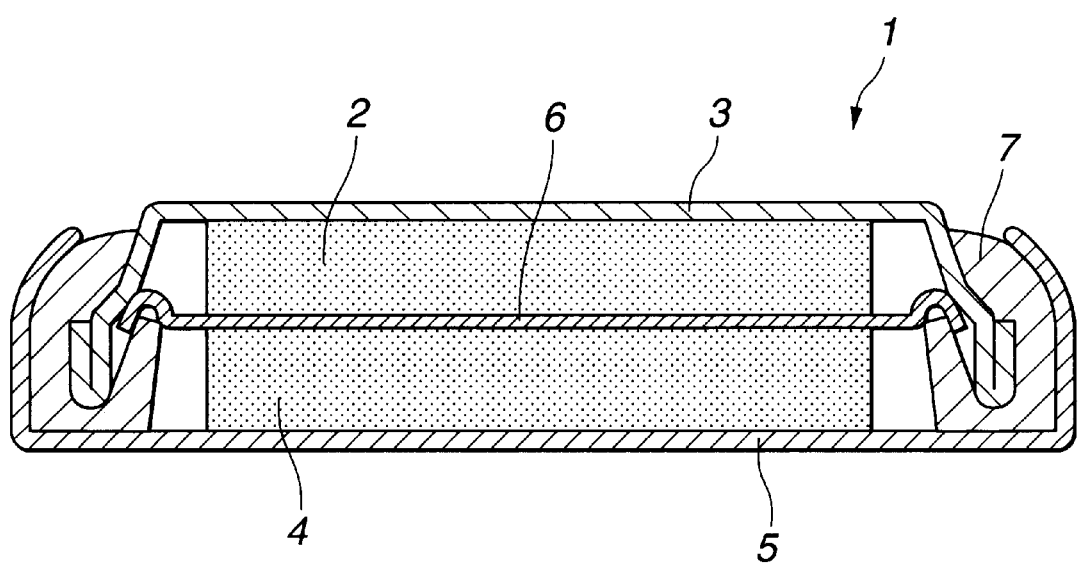
FIG. 1 is a cross sectional view showing an example of the structure of a non-aqueous electrolyte battery according to the present invention.

FIG. 1 shows an example of the structure of a non-aqueous electrolyte battery according to this embodiment. The non-aqueous electrolyte battery 1 incorporates a negative electrode 2, a negative electrode can 3 for accommodating the negative electrode 2, a positive electrode 4, a positive electrode can 5 for accommodating the positive electrode 4, a separator 6 disposed between the positive electrode 4 and the negative electrode 2 and an insulating gasket 7. Non-aqueous electrolytic solution is enclosed in the negative electrode can 3 and the positive electrode can 5.

The negative electrode 2 is formed into coin-type pellet obtained by compressing and molding a negative electrode mix containing a negative-electrode active material and binder resin.

The negative-electrode active material is a material which permits doping/dedoping of magnesium ions. The material which permits doping/dedoping of magnesium ions may be, for example, magnesium or an alloy of magnesium and alkali metal.

The binder resin is polyvinylidene fluoride or the like. The negative electrode mix may be added with a known additive.

The negative electrode can 3 accommodates the negative electrode 2 and serves as an external negative electrode of the non-aqueous electrolyte battery 1.

The positive electrode 4 is formed into coin-type pellet obtained by compressing and molding a positive-electrode active material, a conductive material and binder resin.

The non-aqueous electrolyte battery according to this embodiment incorporates the positive-electrode active material which is $Li_xMO_2$ (where M is an element containing at least Ni or Co). The compound expressed by $Li_xMO_2$ has a layered structure.

Specifically, the compound expressed by $Li_xMO_2$ is exemplified by $Li_xNi_{1-y}Co_yO_2$ ($0 \leq y \leq 1.0$) or the like. Note that $L_xNi_{1-y}Co_yO_2$ has an $\alpha$-$NaFeO_2$ structure. Note that M of the compound expressed by $Li_xMO_2$ may be an element, for example, Al or B except for Ni and Co.

Since $Li_xMO_2$ having the layered structure is employed as the positive-electrode active material, the diffusion paths for magnesium ions can be formed into the two-dimensional shape. When the diffusion paths for magnesium ions are formed into the two-dimensional shape, diffusion of magnesium ions can quickly be performed. Thus, the cycle operation resistance of the non-aqueous electrolyte battery 1 can be improved.

When the non-aqueous electrolyte battery is manufactured by using $Li_xMO_2$ as the positive-electrode active material, a process must be performed to provide lattice spaces for electrochemically dedoping lithium ions from $Li_xMO_2$ and accommodating magnesium ions.

The quantity of lithium to be dedoped is determined such that the value of x of $Li_xMO_2$ satisfies a range $0.1 \leq x \leq 0.5$ when the compound from which lithium has been dedoped is expressed by $Li_xMO_2$. When the range is such that $0 \leq x \leq 0.1$, the compound becomes unstable in terms of the potential. Thus, the oxidizing characteristic is intensified excessively, causing electrolytic solution to undesirably be decomposed. When x satisfies x>0.5, a satisfactorily large number of the lattice spaces for accommodating magnesium ions cannot be obtained. As a result, a satisfactorily large battery capacity cannot be obtained. Therefore, the value of x is made to satisfy $0.1 \leq x \leq 0.5$ so that the compound is stabilized and the lattice spaces for accommodating magnesium ions can be obtained. Thus, a satisfactory large battery capacity can be obtained.

The conductive material is carbon black or graphite. The binder resin is polyvinylidene fluoride. A known additive may be added to the positive electrode mix.

The positive electrode can 5 accommodates the positive electrode 4 and serves as an external positive electrode of the non-aqueous electrolyte battery 1.

The separator 6 insulates the positive electrode 4 and the negative electrode 2 from each other. A known material may be employed which is usually employed as a separator of a non-aqueous electrolyte battery of the foregoing type. For example, a polymer film of polypropylene or the like may be employed.

The insulating gasket 7 is included in the negative electrode can 3 so as to be integrated with the negative electrode can 3. The insulating gasket 7 prevents leakage of non-aqueous electrolytic solution enclosed in the negative electrode can 3 and the positive electrode can 5.

The non-aqueous electrolytic solution is prepared by dissolving an electrolyte in non-aqueous solvent.

The electrolyte may be constituted by magnesium salt, such as $Mg(ClO_4)_2$, $Mg(SO_2CF_3)_2$, magnesium borofluoride ($Mg(BF_4)_2$), magnesium trifluoromethyl sulfonate ($Mg(CF_3SO_3)_2$) or magnesium hexafluorophosphate ($Mg(PF_6)_2$).

The non-aqueous solvent may be a variety of non-aqueous solvent which have been employed as the non-aqueous solvent for the non-aqueous electrolyte batteries. Specifically, any one of the following materials may be employed: propylene carbonate, ethylene carbonate, butylene carbonate, vinylene carbonate, $\gamma$-butyl lactone, sulfolane, 1,2-dimethoxyethane, 1,2-diethoxyethane, 2-methyltetrahydrofuran, 3-methyl-1,3-dioxolane, methyl propionate, methyl butyrate, dimethyl carbonate, diethyl carbonate and dipropyl carbonate. The foregoing non-aqueous solvent may be employed solely or a plurality of materials may be mixed. It is preferable that cyclic carbonate or chain carbonate is employed from a viewpoint of realizing electric stability.

From a viewpoint of the electric stability of the non-aqueous electrolytic solution, it is preferable that non-aqueous electrolytic solution is employed which is prepared by dissolving $Mg(ClO_4)_2$ in solvent containing at least either of ethylene carbonate or $\gamma$-butyl lactone.

The non-aqueous electrolyte battery 1 according to this embodiment enables magnesium ions to quickly be diffused and the cycle operation resistance to significantly be improved. The non-aqueous electrolyte battery 1 is manufactured, for example, as follows.

The negative electrode 2 is manufactured as follows: initially, the negative-electrode active material and the binder resin are uniformly mixed with each other so that the negative electrode mix is prepared. Then, the obtained negative electrode mix is compressed and molded so that coin-shape pellet is obtained. Thus, the negative electrode 2 is manufactured. The binder resin of the negative electrode mix may be known binder resin. Note that a known additive may be added to the negative electrode mix.

The positive electrode 4 is manufactured as follows: initially, the positive-electrode active material, the conductive material and the binder resin are uniformly mixed with one another so that the positive electrode mix is prepared. Then, the obtained positive electrode mix is compressed and molded so that coin-shape pellet is obtained. Thus, the positive electrode 4 is manufactured. The binder resin of the positive electrode mix may be known binder resin. Note that a known additive may be added to the positive electrode mix.

The non-aqueous electrolytic solution is prepared by dissolving magnesium salt in the non-aqueous solvent. The non-aqueous solvent of the non-aqueous electrolytic solution may be known non-aqueous solvent. A known additive may be added to the non-aqueous electrolytic solution.

The negative electrode 2 is accommodated in the negative electrode can 3, the positive electrode 4 is accommodated in the positive electrode can 5, and the separator 6 constituted by a porous film made of polypropylene is disposed between the negative electrode 2 and the positive electrode 4. The non-aqueous electrolytic solution is introduced into the negative electrode can 3 and the positive electrode can 5. Then, the negative electrode can 3 and the positive electrode can 5 are crimped through the insulating gasket 7 so as to be secured to each other. Thus, the battery is manufactured.

The obtained battery is subjected to an electrochemical lithium dedoping process. After the lithium dedoping process has been completed, the battery is decomposed to remove the non-aqueous electrolytic solution. Then, the battery is cleaned, and then dried.

Finally, the negative electrode 2 is again accommodated in the negative electrode can 3, the positive electrode 4 is accommodated in the positive electrode can 5, and the separator 6 is disposed between the negative electrode 2 and the positive electrode 4. Then, new non-aqueous electrolytic solution is introduced into the negative electrode can 3 and the positive electrode can 5. Then, the negative electrode 2 and the positive electrode 4 are crimped so as to be secured to each other. Thus, the non-aqueous electrolyte battery 1 is manufactured.

In the foregoing embodiment, the negative electrode 2 and the positive electrode 4 are obtained by compressing and molding the negative electrode mix and the positive electrode mix to form coin-shape pellets. The present invention is not limited to the foregoing structure. Specifically, the present invention may be applied to a structure in which the foregoing negative electrode mix and the positive electrode mix are dispersed in solvent, such as formamide or N-methyl pyrolidone so that paste is prepared. The paste is applied to a collector, and then the collector is dried so that the negative electrode 2 and the positive electrode 4 are manufactured.

In the foregoing embodiment, the non-aqueous electrolyte battery 1 incorporates the non-aqueous electrolytic solution prepared by dissolving the electrolyte in the non-aqueous solvent. The present invention may be applied to a battery of a type incorporating a solid electrolyte obtained by dispersing an electrolyte in a matrix polymer and a battery incorporating a gel solid electrolyte containing swelling solvent. The battery according to the present invention may be applied to both of a primary battery and the secondary battery.

The shape of the battery according to the present invention is not limited. For example, a cylindrical shape, a rectangular shape, a coin shape and a button shape may be employed. Also the size is not limited. For example, a thin type battery and a large battery may be employed.

EXAMPLES

To confirm the effects of the invention, the foregoing battery was manufactured to evaluate the characteristics.

Example 1

Initially, the positive electrode was manufactured as follows.

Initially, marketed $LiOH \cdot H_2O$, $Ni(OH)_2$ and $Co_3O_4$ were weighed and mixed in such a manner that the molar ratios were such that Li:Ni:Co=1.0:0.8:0.2. Then, the mixture was baked at 750° C. in oxygen for 12 hours so that powder serving as the positive-electrode active material was thermally prepared. Prepared powder was a layered compound (the $\alpha$-$NaFeO_2$ structure) as a result of confirmation by performing XRD measurement.

Then, 90 parts by weight of the obtained positive-electrode active material, 7 parts by weight of graphite serving as the conductive material and 3 parts by weight of polyvinylidene fluoride serving as the binder resin were mixed with each other so that the positive electrode mix was prepared. The positive electrode mix was compressed and molded by operating a roll press so that a disc-shape positive electrode was manufactured.

On the other hand, magnesium foil was punched to form a disc-shape member having substantially the same diameter as that of the positive electrode so that the negative electrode was manufactured.

Moreover, $Mg(ClO_4)_2$ was, at a concentration of 1 mol/l, dissolved in mixed solvent of 60 vol % ethylene carbonate and 40 vol % dimethyl carbonate so that the non-aqueous electrolytic solution was prepared.

The thus-obtained positive electrode was accommodated in the positive electrode can, the negative electrode was accommodated in the negative electrode can and the separator constituted by a small-pore polypropylene film was disposed between the positive electrode and the negative electrode. Then, the non-aqueous electrolytic solution was enclosed in the positive electrode can and the negative electrode can. Then, the positive electrode can and the negative electrode can were crimped so as to be secured to each other so that a battery was manufactured.

The obtained battery was subjected to an electrochemical lithium dedoping process in such a manner that the positive-electrode active material satisfied the relationship that Li/(Ni+Co)=0.1. The battery subjected to the lithium dedoping process was decomposed, and then the electrolytic solution was removed. Then, the electrolytic solution was cleaned and the battery was dried.

Finally, the positive electrode was again accommodated in the positive electrode can. The negative electrode was accommodated in the negative electrode can. The separator constituted by the small-pore polypropylene film was disposed between the positive electrode and the negative electrode. Then, the non-aqueous electrolytic solution was enclosed in the positive electrode can and the negative electrode can. Then, the positive electrode can and the negative electrode can were crimped to be secured to each other. Thus, a coil-shape (#2025 type) non-aqueous electrolyte battery was manufactured.

Example 2

A similar process to that according to Example 1 was performed except for a structure of this example that marketed $LiCoO_2$ was employed as the positive-electrode active material and a lithium dedoping of the positive-electrode active material was performed in such a manner that the relationship Li/Co=0.5 was satisfied. Thus, a non-aqueous electrolyte battery was manufactured.

Example 3

A similar process to that according to Example 1 was performed except for a structure of this example that the electrolytic solution was prepared such that $Mg(ClO_4)_2$ was, at a concentration of 1 mol/l, dissolved in solvent obtained by mixing 40 parts by volume of dimethyl carbonate in 60 parts by volume of propylene carbonate. Thus, a non-aqueous electrolyte battery was manufactured.

Example 4

A similar process to that according to Example 2 was performed except for a structure of this example that the electrolytic solution was prepared such that $Mg(ClO_4)_2$ was, at a concentration of 1 mol/l, dissolved in solvent obtained by mixing 40 parts by volume of dimethyl carbonate in 60 parts by volume of propylene carbonate. Thus, a non-aqueous electrolyte battery was manufactured.

Comparative Example 1

A similar process to that according to Example 1 was performed except for a structure of this comparative example that $V_2O_5$ was employed as the positive-electrode active material and the lithium dedoping process was not performed. Thus, a non-aqueous electrolyte battery was manufactured.

Comparative Example 2

A similar process to that according to Example 1 was performed except for a structure of this comparative example that $MoO_3$ was employed as the positive-electrode active material and the lithium dedoping process was not performed. Thus, a non-aqueous electrolyte battery was manufactured.

The cycle operation resistance of the manufactured non-aqueous electrolyte batteries was evaluated.

The cycle operation resistance was evaluated by performing experiments performed at 23° C. Initially, constant-current discharge of each battery was performed with 100 $\mu A/cm^2$ until the final voltage was made to be 0.5 V (with respect to $Mg^{2+}/Mg$ potential). When the voltage of the battery was made to be 0.5 V, the discharge was interrupted. Then, the operation was switched to a charging operation. The charging operation was performed until the final voltage was made to be 2.5 V (with respect to $Mg^{2+}/Mg$ potential). When the voltage of the battery was made to be 2.5 V, the charging operation was interrupted. The constant voltage of 2.5 V was maintained for 4 hours.

The foregoing process was defined as one cycle. The foregoing cycle was repeated 20 times. In accordance with the ratio ($C_N/C_1$) of the discharge capacity ($C_N$) at the Nth cycle with respect to the discharge capacity ($C_1$) at the first cycle, the discharge capacity retention ratio at the Nth cycle was obtained.

Figure 2:
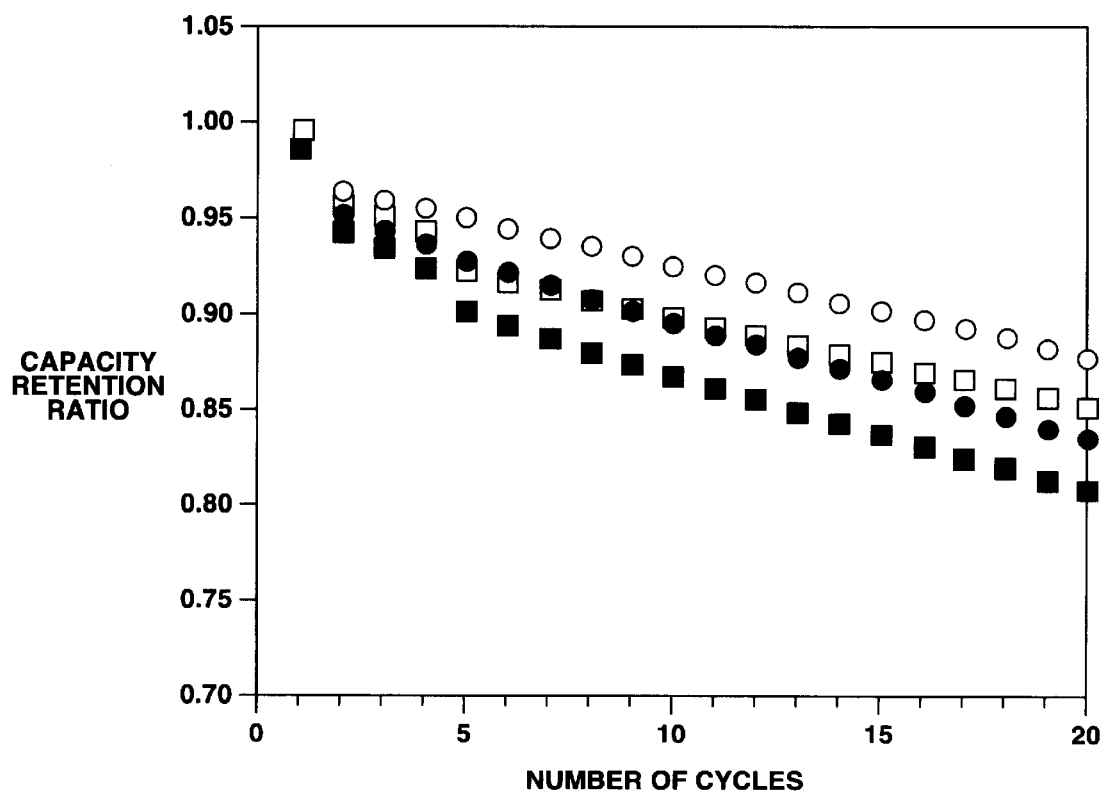
FIG. 2 is a graph showing the relationship between the number of cycles and discharge-capacity retention ratio of batteries manufactured in examples.

FIG. 2 shows the relationship between the number of cycles of each of the batteries according to Examples 1 and 2 and Comparative Examples 1 and 2 and the discharge capacity retention ratio of the same. In FIG. 2, results of the battery according to Example 1 were indicated with white circles. Results of the battery according to Example 2 were indicated with white squares. Results of the battery according to Comparative Example 1 were indicated with black circles. Results of the battery according to Comparative Example 2 were indicated with black squares.

As can be understood from FIG. 2, the batteries according to Examples 1 and 2 and each having the structure that the positive-electrode active material according to the present invention was employed and the lithium dedoping process was performed exhibited high discharged capacity retention ratios as compared with those of the batteries according to the comparative examples.

Figure 3:
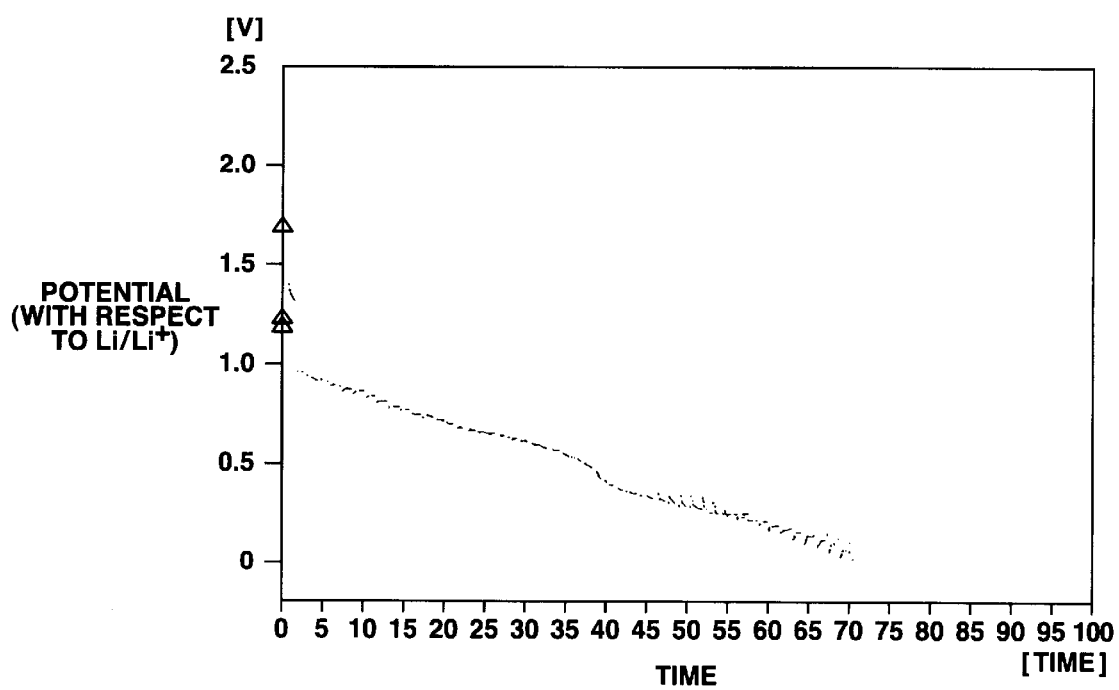
FIG. 3 is a graph showing the relationship between discharge time and voltage of the battery according to Example 1.

A discharge curve of the battery according to Example 1 was shown in FIG. 3. A fact can be understood that excellent discharge characteristics were realized.

Figure 4:
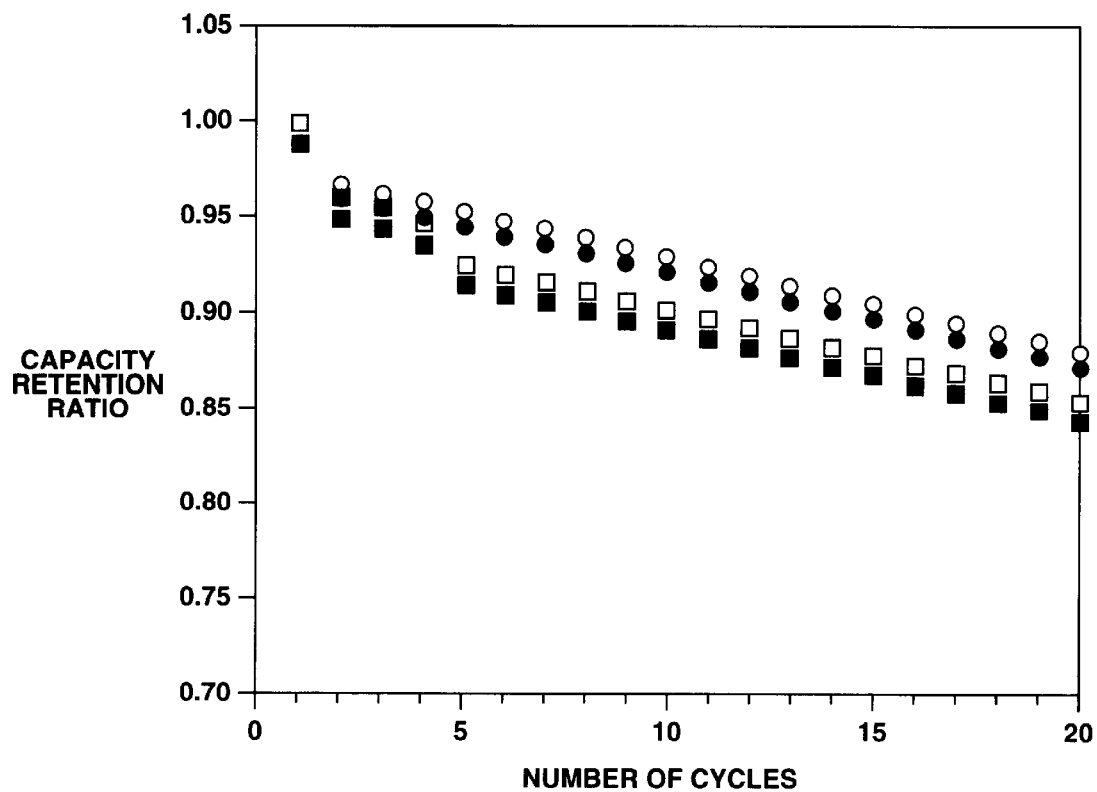
FIG. 4 is a graph showing the relationship between the number of cycles and the discharge-capacity retention ratio of the batteries manufactured in the examples.

FIG. 4 shows the relationship between the number of cycles of each of the batteries according to Examples 1 to 4 and the discharge capacity retention ratio of the same. In FIG. 4, results of the battery according to Example 1 were indicated with white circles. Results of the battery according to Example 2 were indicated with white squares. Results of the battery according to Example 3 were indicated with black circles. Results of the battery according to Example 4 were indicated with black squares.

A comparison was made between Examples 1 and 3 and between Examples 2 and 4 in which the positive-electrode active material was the same and the electrolytic solution was different. As can be understood from the results, Examples 1 and 2 incorporated the solvent containing at least ethylene carbonate had higher discharge capacity retention ratios as compared with Examples 3 and 4 which did not contain ethylene carbonate.

Batteries were manufactured by a method similar to the foregoing method such that positive-electrode active materials were employed such that x of $Li_xCoO_2$ was varied to 0.4, 0.5, 0.6, 0.7 and 0.8. Then, the discharge capacity of each battery was measured. Results were shown in FIG. 5.

Figure 5:
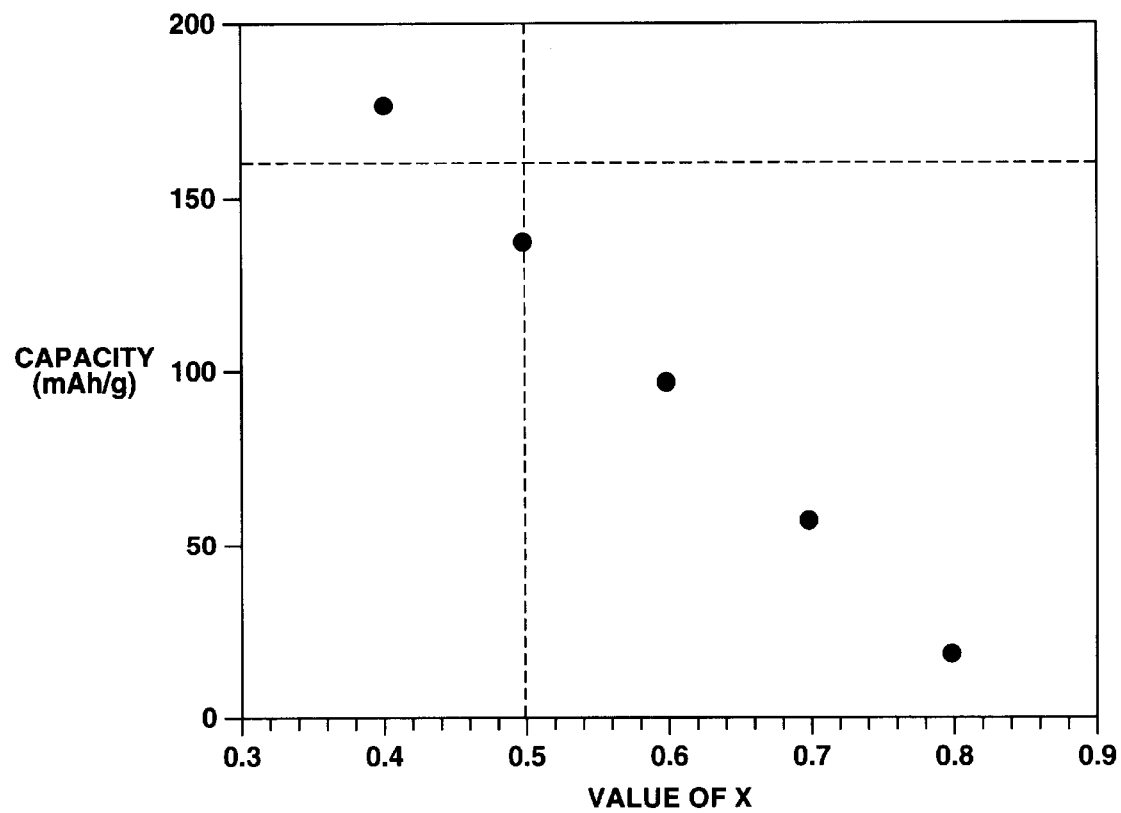
FIG. 5 is a graph showing the relationship between the value of x of $Li_xCoO_2$ and the discharge capacity.

In FIG. 5, the capacities (170 mAh/g) obtained by using $V_2O_5$ disclosed in the document (J. Electrochem. Soc., Vol. 40, No. 1, Jan (1993) 140) was indicated with dashed lines.

As can be understood from FIG. 5, the discharge capacity is reduced as the value of x was enlarged. The reason for this lies in that the lattice spaces formed owing to dedoping of lithium and capable of accommodating magnesium ions is decreased. When the value of x satisfies the relationship x>0.5, the discharge capacity is made to be smaller than that obtained by using conventional $V_2O_5$. As described above, when the value of x satisfies $0 \leq x < 0.1$, the compound becomes unstable in terms of the potential.

Therefore, the value of x is made to satisfy $0.1 \leq x \leq 0.5$ so that the lattice space for accommodating magnesium ions can be obtained. Moreover, a satisfactorily large battery capacity larger than that obtainable from $V_2O_5$ can be obtained.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A non-aqueous electrolyte battery comprising:
    a positive electrode containing $Li_xMO_2$ (where M is an element containing at least Ni or Co) as a positive-electrode active material thereof,
    a negative electrode disposed opposite to said positive electrode and containing a negative-electrode active material which permits doping/dedoping magnesium ions; and
    a non-aqueous electrolyte disposed between said positive electrode and said negative electrode and containing non-aqueous solvent and an electrolyte constituted by magnesium salt, wherein
    the value of x of $Li_xMO_2$ satisfies a range $0.1 \leq x \leq 0.5$.

2. A non-aqueous electrolyte battery according to claim 1, wherein
    said non-aqueous electrolyte incorporates said solvent which contains at least either of ethylene carbonate or γ-butylolactone, and
    $Mg(ClO_4)_2$ is dissolved in said solvent.

3. A non-aqueous electrolyte battery according to claim 1, wherein
    said negative-electrode active material is magnesium or an alloy of magnesium and alkali metal.

4. A non-aqueous electrolyte battery according to claim 1, wherein
    said electrolyte is at least one material selected from a group consisting of Mg $(ClO_4)_2$, $Mg(SO_2CF_3)_2$, magnesium borofluoride ($Mg(BF_4)_2$), magnesium trifluoromethyl sulfonate ($Mg(CF_3SO_3)_2$) and magnesium hexafluorophosphate (Mg $(PF_6)_2$).

5. A non-aqueous electrolyte battery according to claim 1, wherein
    said non-aqueous solvent is at least one material selected from a group consisting of propylene carbonate, ethylene carbonate, butylene carbonate, vinylene carbonate, γ-butyl lactone, sulfolane, 1,2-dimethoxyethane, 1,2-diethoxyethane, 2-methyltetrahydrofuran, 3-methyl-1,3-dioxolane, methyl propionate, methyl butyrate, dimethyl carbonate, diethyl carbonate and dipropyl carbonate.

* * * * *